United States Patent
Mak et al.

(10) Patent No.: US 7,925,213 B2
(45) Date of Patent: *Apr. 12, 2011

(54) METHOD AND SYSTEM FOR AUDIO SIGNAL PROCESSING FOR BLUETOOTH WIRELESS HEADSETS USING A HARDWARE ACCELERATOR

(75) Inventors: Siukai Mak, Poway, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1430 days.

This patent is subject to a terminal disclaimer.

(21) Appl. No.: 11/248,807

(22) Filed: Oct. 12, 2005

(65) Prior Publication Data

US 2007/0082615 A1   Apr. 12, 2007

(51) Int. Cl.
*H04B 7/00* (2006.01)
(52) U.S. Cl. .............. 455/41.2; 455/74.1; 455/552.1; 455/556.1
(58) Field of Classification Search .............. 455/41.2, 455/74.1, 552.1, 556.2
See application file for complete search history.

(56) References Cited

U.S. PATENT DOCUMENTS

| | | | |
|---|---|---|---|
| 6,091,777 A * | 7/2000 | Guetz et al. | 375/240.11 |
| 6,271,677 B1 * | 8/2001 | Ohta et al. | 326/16 |
| 6,882,694 B2 * | 4/2005 | Olivier | 375/346 |
| 6,917,955 B1 * | 7/2005 | Botchev | 708/406 |
| 6,944,245 B2 * | 9/2005 | Stewart et al. | 375/350 |
| 7,007,056 B2 * | 2/2006 | Ryu | 708/404 |
| 2006/0148405 A1 * | 7/2006 | Wu et al. | 455/41.2 |
| 2006/0205449 A1 * | 9/2006 | Hillyard | 455/575.2 |
| 2007/0082612 A1 * | 4/2007 | Valve et al. | 455/41.2 |

* cited by examiner

*Primary Examiner* — Tuan H Nguyen
(74) *Attorney, Agent, or Firm* — McAndrews, Held & Malloy, Ltd.

(57) ABSTRACT

Aspects of a method and a system for audio signal processing for Bluetooth wireless headsets using a hardware accelerator are presented. Aspects of a method for processing a signal may include configuring circuitry within a single chip to establish at least one of a plurality of data paths for processing input data for a plurality of signal processing algorithms for implementing a subband codec (SBC). The method may also include executing vector rotation of data during processing within one or more of the plurality of data paths. Aspects of a system may include a hardware accelerator that configures circuitry within a single chip to establish at least one of a plurality of data paths for processing input data for a plurality of signal processing algorithms for implementing SBC. The hardware accelerator may execute vector rotation of data during processing within one or more of the plurality of data paths.

20 Claims, 16 Drawing Sheets

METHOD AND SYSTEM FOR AUDIO SIGNAL PROCESSING FOR BLUETOOTH WIRELESS HEADSETS USING A HARDWARE ACCELERATOR

CROSS-REFERENCE TO RELATED APPLICATIONS/INCORPORATION BY REFERENCE

Not Applicable.

FIELD OF THE INVENTION

Certain embodiments of the invention relate to wireless communications. More specifically, certain embodiments of the invention relate to a method and system for audio signal processing for Bluetooth headsets using a hardware accelerator.

BACKGROUND OF THE INVENTION

Bluetooth is a short-range wireless communications capability that enables connection between consumer and computer equipment while eliminating wires. Equipment that is enabled to utilize Bluetooth technology may be referred to as Bluetooth devices. Bluetooth devices within a range of approximately 10 meters of each other may communicate utilizing a 2.4-gigahertz frequency band. Examples of Bluetooth devices may comprise personal digital assistants (PDA), headsets, telephones, home audio equipment, and computers. Capabilities enabled by Bluetooth technology may comprise eliminating cables linking computers to printers, keyboards, and mouse devices, making calls from a wireless headset connected via wireless link to a wired or wireless telephone, and the playing of audio from a portable MP3 player via a home audiovisual system with no wired connection between the MP3 player and the home audiovisual system.

Bluetooth is designed to enable a plurality of Bluetooth devices to operate in a personal area network (PAN) environment. The plurality of Bluetooth devices in an environment may comprise a network known as a piconet. Within the approximately 10-meter range of Bluetooth technology a plurality of piconets may exist. Thus, Bluetooth technology may enable a plurality of piconets to coexisting within a home environment. For example, a first piconet may comprise computer equipment in a home environment, a second piconet may comprise audiovisual equipment in a home environment, a third piconet may comprise appliances in the home environment such as air conditioners, ovens, and lighting, and so forth.

Bluetooth headsets are becoming a popular alternative to wired headsets due to their small size, portability, and convenience. Bluetooth headsets may support audio signal processing functions such as audio codec, acoustical noise cancellation and acoustical echo cancellation, for example. The computationally intensive nature of these audio signal processing functions combined with the low power utilization required of Bluetooth headsets presents a challenge to designers of Bluetooth headsets.

In some conventional systems, audio signal processing algorithms may be implemented by utilizing an embedded control processor. However, because of the high clock rates at which the embedded control processor may be required to operate, the rate of power utilization may be too high for use in low power applications such as Bluetooth headsets, for example. In some conventional systems, the embedded control processor may be co-located, in a common integrated circuit (IC) chip with a digital signal processing (DSP) processor. A limitation of this conventional approach is that the system designer may be forced to design the audio signal processing algorithms according to the capabilities of the DSP processor. In addition, software development may be limited by the software development tools and environment that are available to the software developer. Consequently, a conventional system that utilizes this approach may comprise sub-optimal software code that executes within a sub-optimal hardware architecture.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for audio signal processing for Bluetooth headsets using a hardware accelerator, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for audio signal processing for Bluetooth headsets using a hardware accelerator. One aspect of the invention comprises an audio hardware accelerator for Bluetooth headset applications, which may be utilized for executing audio signal processing algorithms such as audio codec, and acoustical echo cancellation.

Figure 1:
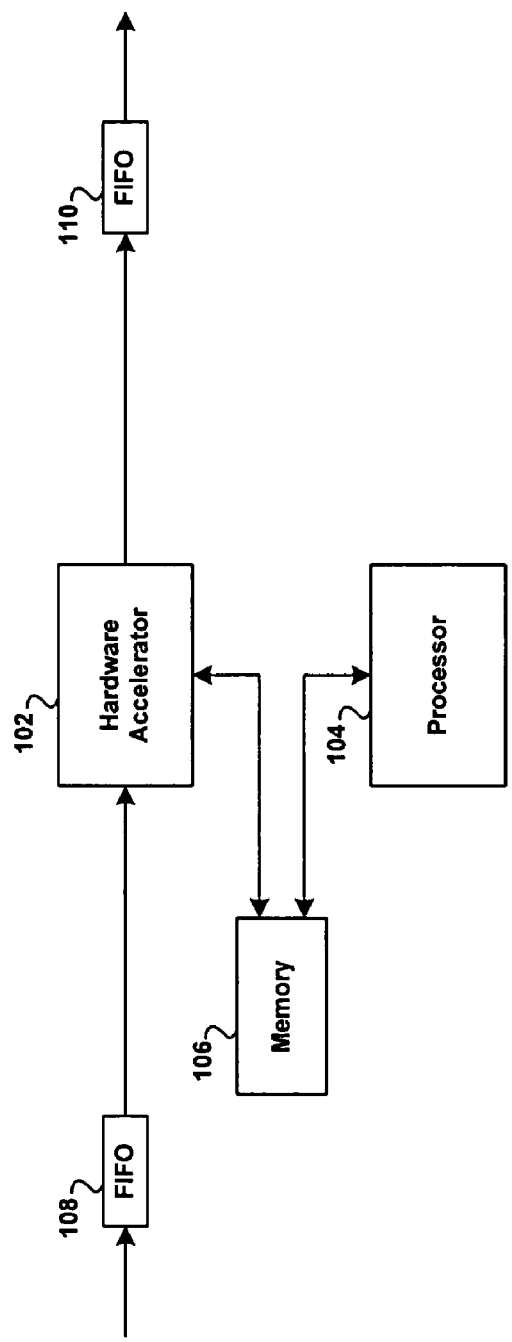
FIG. 1 is a block diagram of a system for audio signal processing, in accordance with an embodiment of the invention.

FIG. 1 is a block diagram of a system for audio signal processing, in accordance with an embodiment of the invention. Referring to FIG. 1 there is shown a hardware accelerator 102, a processor 104, memory 106, an input first in first out (FIFO) buffer 108, and an output FIFO 110. The memory 106 may comprise suitable circuitry and/or logic that may be utilized to store data and/or to retrieve previously stored data. The memory 106 may comprise suitable circuitry and/or logic that may be utilized to store executable instructions or code and/or to retrieve previously stored executable instructions or code.

The input FIFO 108 or output FIFO 110 may comprise suitable circuitry and/or logic that may be utilized to store data and/or retrieve previously stored data. The data at a given time instant may comprise data that was stored in the input FIFO 108 or output FIFO 110 at an earliest time instant relative to data stored at that given time instant. The processor 104 may comprise suitable circuitry and/or logic that may be adapted to retrieve data and/or executable code from memory 106. The executable code may cause the processor 104 to perform steps related to audio signal processing, for example. The hardware accelerator 102 may comprise suitable circuitry and/or logic that may be adapted to execute audio signal processing algorithms, for example. The hardware accelerator 102 may retrieve data and/or instructions from memory 106. The hardware accelerator 102 may utilize the retrieved data and/or instructions to perform steps related to audio signal processing, for example. The input FIFO 108 and the output FIFO 110 may be coupled to the hardware accelerator 102. The memory 106 may be coupled to the hardware accelerator 102 and the processor 104.

In operation the input FIFO 108 may receive digitized samples from an audio stream at distinct time instants. The input FIFO 108 may store a plurality of digitized samples. In this regard, the input FIFO 108 may function as a buffer. The stored plurality of digitized sampled may be buffered by the input FIFO 108. A digitized sample that was received at an earliest time instant, relative to other digitized samples currently stored in the input FIFO 108, may be output and received by the hardware accelerator 102. The hardware accelerator 102 may utilize previously retrieved instructions from the memory 106 to perform steps on the digitized sample related to an audio signal processing algorithm, for example.

The hardware accelerator 102 may utilize the received digitized sample and data retrieved from memory 106 when performing those steps, for example. The hardware accelerator 102 may compute an intermediate result based on the received digitized sample and on data retrieved from memory 106. The hardware accelerator 102 may output the computed intermediate result to the memory 106. The hardware accelerator 102 may compute a final result based on the received digitized sample and on data retrieved from memory 106. The hardware accelerator 102 may output the computed final result to the output FIFO 110. The output FIFO 110 may store the computed final result in addition to a plurality of previously computed final results. The output FIFO 110 may buffer the computed final result. The processor 104 may store instructions and/or data in the memory 106. The hardware accelerator 102 may subsequently utilize the stored instructions and/or data.

Figure 2:
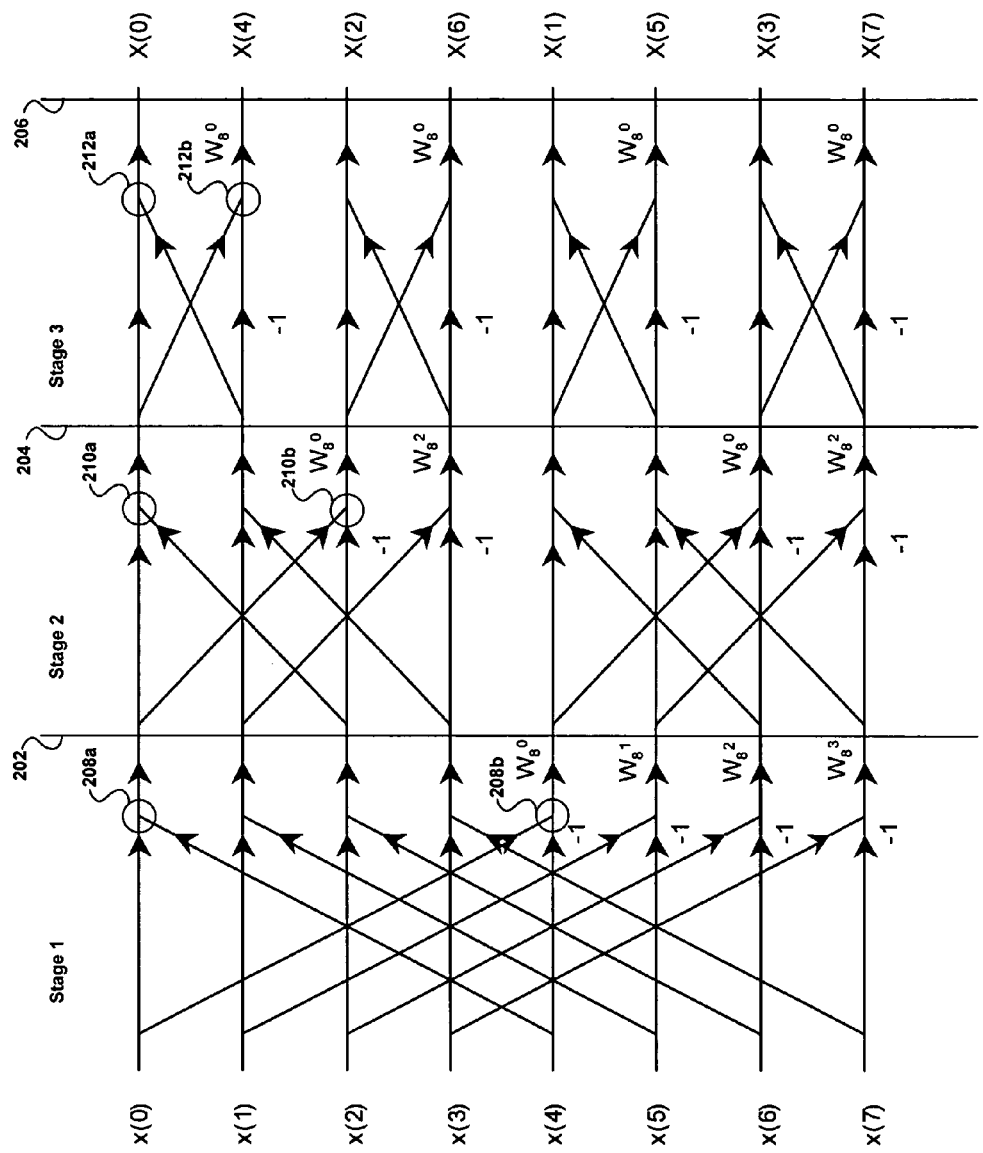
FIG. 2 illustrates an exemplary implementation of a radix-2 FFT algorithm, which may be utilized in connection with an embodiment of the invention.

FIG. 2 illustrates an exemplary implementation of a radix-2 FFT algorithm, which may be utilized in connection with an embodiment of the invention. The radix-2 fast Fourier transform (FFT) is an exemplary audio signal processing algorithm that may be implemented by the hardware accelerator 102, in accordance with an embodiment of the invention. Referring to FIG. 2 there is shown a plurality of stages comprising stage 1 202, stage 2 204, and stage 3 206, a plurality of stage 1 computation nodes 208a and 208b, a plurality of stage 2 computation nodes 210a and 210b, and a plurality of stage 3 computation nodes 212a and 212b.

The stage 1 computation nodes 208a and 208b may form a stage 1 butterfly. The stage 2 computation nodes 210a and 210b may form a stage 2 butterfly. The stage 3 computation nodes 212a and 212b may form a stage 3 butterfly. Stages 202, 204 or 206 may comprise a plurality of butterflies. The radix-2 fast Fourier transform (FFT) algorithm may receive a plurality input samples x(0), x(1), x(2), x(3), x(4), x(5), x(6), and x(7), and compute a plurality of outputs X(0), X(1), X(2), X(3), X(4), x(5), X(6), and X(7), for example. The number input samples, N, may be equal to the number of points utilized by the FFT algorithm, for example N=8 points. The radix utilized by the FFT algorithm may be referred to as r, for example r=2 for a radix-2 FFT algorithm. The number of stages, ns, utilized by the FFT algorithm may be equal to the base r logarithm applied to the number of points N. For example ns=log$_2$8, or about 3 stages for a radix-2 FFT algorithm that utilizes 8 input samples. The computation nodes 208a, 208b, 210a and 210b may compute intermediate results in the radix-2 FFT algorithm. The computation nodes 212a and 212b may compute final results in the radix-2 FFT algorithm.

In many implementations, an FFT may be implemented as a discrete Fourier transform (DFT). For an 8 point radix-2 DFT, an output X(k), where k may be a number between 0 and 7 for example, may be computed based on a plurality of samples x(n), where n may be a number between 0 and 7 for example. The relationship may be expressed:

$$X(k) = \sum_{n=0}^{N-1} x(n) e^{-j2\pi k n / N},$$

where N may represent the number of points utilized in the FFT algorithm. The value of e is approximately 2.718. The quantity j may represent the square root of −1. The value of π is approximately 3.14.

Figure 3:
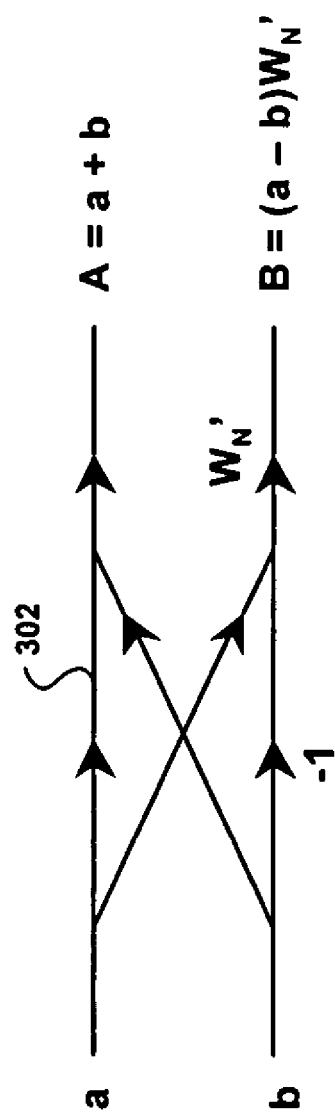
FIG. 3 illustrates an exemplary butterfly stage of a radix-2 FFT algorithm, which may be utilized in connection with an embodiment of the invention.

FIG. 3 illustrates an exemplary butterfly stage of a radix-2 FFT algorithm, which may be utilized in connection with an embodiment of the invention. Referring to FIG. 3 there is shown a butterfly stage 302. The butterfly stage 302 may receive input samples a and b and compute outputs A and B. The butterfly stage 302 may comprise a first wing, wing 0, and a second wing, wing 1. The first wing may be utilized to compute the output A and the second wing may be utilized to compute the output B. The value of the computed output A may be approximately equal to a sum of the values of the received input samples a and b, A=a+b. The value of the computed output B may be approximately equal to a scaled difference of the values of the received input samples a and b, $B=(a-b)W_N^q$. The scaling value, $W_N^q$, may be referred to as a twiddle factor. The number N may represent the number of points in an FFT implementation. For the radix-2 FFT implementation, the exponent q may be computed based on the number of stages in the FFT algorithm, ns, the number of the current stage, cs, the number of the current butterfly, cb, and the number of the wing, nw, within the current butterfly. The relationship may be expressed:

$$q=nw*((cb)\mathrm{mod}(2^{ns-1-cs}))*2^{cs} \qquad \text{equation [1]}$$

where the modulus, (y)mod(x), represents the value of y in the numerical base x. The stages may be numbered 0, 1, 2, the butterflies within a stage may be numbered 0, 1, 2, 3, and the wings may be numbered 0, 1, for example.

The twiddle factor may be represented as a complex number. The complex value of $W_N$ may be represented $W_N = e^{-j2\pi/N}$. The value A may be computed by any of computation nodes 208a, 210a or 212a, for example. The value B may be computed by any of computation nodes 208b, 210b or 212b, for example. A twiddle factor $W_N^q$ may be represented $W_N^q = e^{-j2\pi q/N}$. The twiddle factor utilized by the computation node 208b, 210b or 212b may be represented as a scaling factor $W_8^0$. The number of mathematical operations performed within the exemplary butterfly stage in a radix-2 FFT implementation may comprise 2 complex addition operations and 1 complex multiplication operation.

Figure 4:
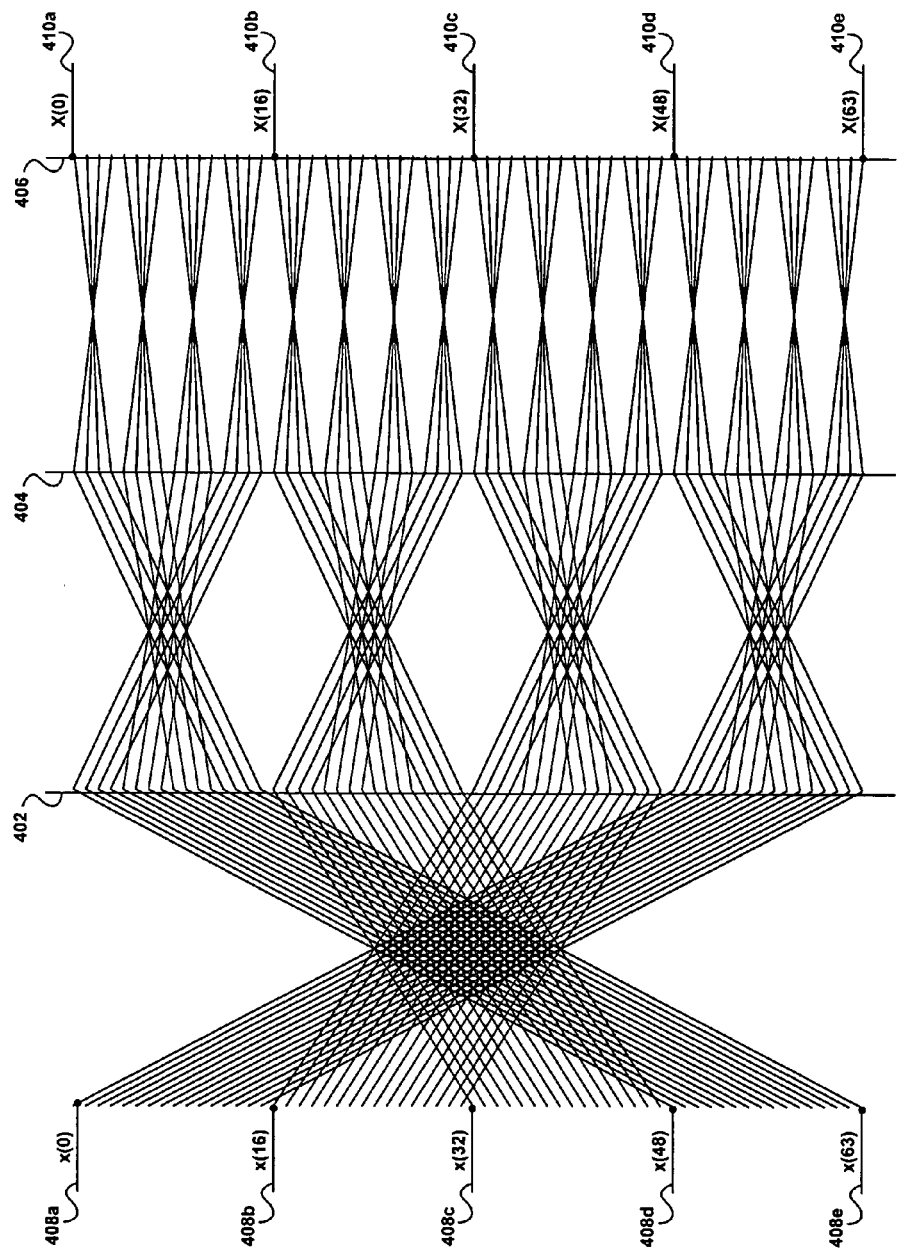
FIG. 4 illustrates an exemplary implementation of a radix-4 FFT algorithm, which may be utilized in connection with an embodiment of the invention.

FIG. 4 illustrates an exemplary implementation of a radix-4 FFT algorithm, which may be utilized in connection with an embodiment of the invention. The radix-4 fast Fourier transform (FFT) is an exemplary audio signal processing algorithm that may be implemented by the hardware accelerator 102, in accordance with an embodiment of the invention. Referring to FIG. 4 there is shown a stage 1 402, a stage 2 404, a stage 3 406, a plurality of input samples x(0) 408a, x(16) 408b, x(32) 408c, x(48) 408d and x(63) 408e, and a plurality of outputs X(0) 410a, X(16) 410b, X(32) 410c, X(48) 410d, and X(63) 410e.

The exemplary radix-4 FFT implementation of FIG. 4 may comprise a total of 64 points comprising input samples numbered x(0), x(1) . . . x(63). The exemplary radix-4 FFT implementation may comprise a total of 64 points comprising outputs numbered X(0), X1) . . . X(63). The number of stages utilized by the FFT algorithm may be the base r=4 logarithm applied to the number of points N=64, for example $\log_4 64=3$ stages for a radix-4 FFT algorithm that utilizes 64 input samples. The stage 402 404 or 406 may comprise a plurality of butterfly stages. For example, a computation node within a stage 1 butterfly may compute an intermediate result based on input samples 408a, 408b, 408c and 408d.

Figure 5:
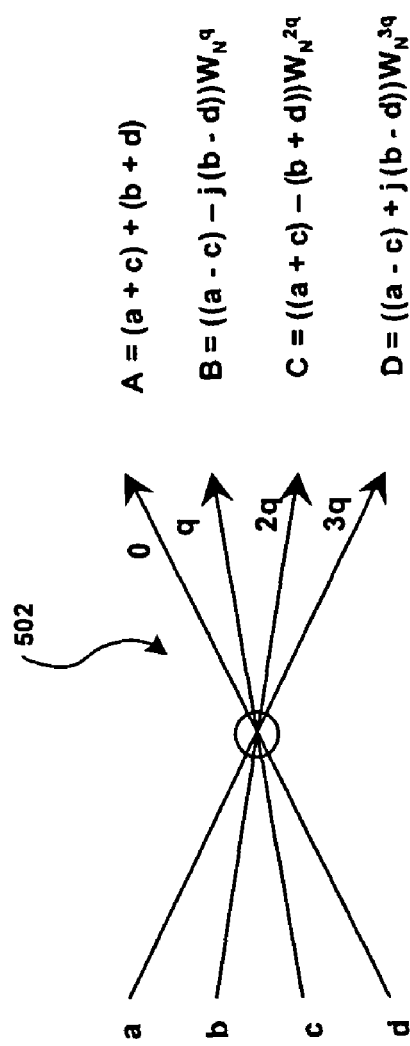
FIG. 5 illustrates an exemplary butterfly stage of a radix-4 FFT algorithm, which may be utilized in connection with an embodiment of the invention.

FIG. 5 illustrates an exemplary butterfly stage of a radix-4 FFT algorithm, which may be utilized in connection with an embodiment of the invention. Referring to FIG. 5 there is shown a butterfly stage 502. The butterfly stage 502 may receive input samples a, b, c and d and compute outputs A, B, C and D. In one exemplary butterfly stage, the input samples a, b, c and d may correspond to input samples 408a, 408b, 408c and 408d. The value of the computed output A may be approximately equal to a sum of the values of the received input samples, A=a+b+c+d. The value of the computed output B may be approximately equal to the complex quantity $B=((a-c)-j(b-d))W_N^q$. The scaling value, $W_N^q$, may be referred to as a twiddle factor. The quantity j may represent the square root of −1. The twiddle factor may be represented as a complex number. The value of the computed output C may be approximately equal to the complex quantity $C=((a+c)-j(b+d))W_N^{2q}$. The value of the computed output D may be approximately equal to the complex quantity $D=((a-c)+j(b-d))W_N^{3q}$. For the radix-4 FFT implementation, the exponent q may be computed, in a manner similar to equation [1], based on the number of stages in the FFT algorithm, ns, the number of the current stage, cs, the number of the current butterfly, cb, and the number of the wing, nw, within the current butterfly. The relationship may be expressed:

$$q=nw*((cb)\mathrm{mod}(4^{ns-1-cs}))*4^{cs} \qquad \text{equation [2]}$$

where the stages may be numbered 0, 1, 2, the butterflies within a stage may be numbered 0, 1, 2 . . . 15, and the wings may be numbered 0, 1, 2, 3, for example. The number of mathematical operations performed within the exemplary butterfly stage in a radix-4 FFT implementation may comprise 8 complex addition operations and 3 complex multiplication operations.

Figure 6:
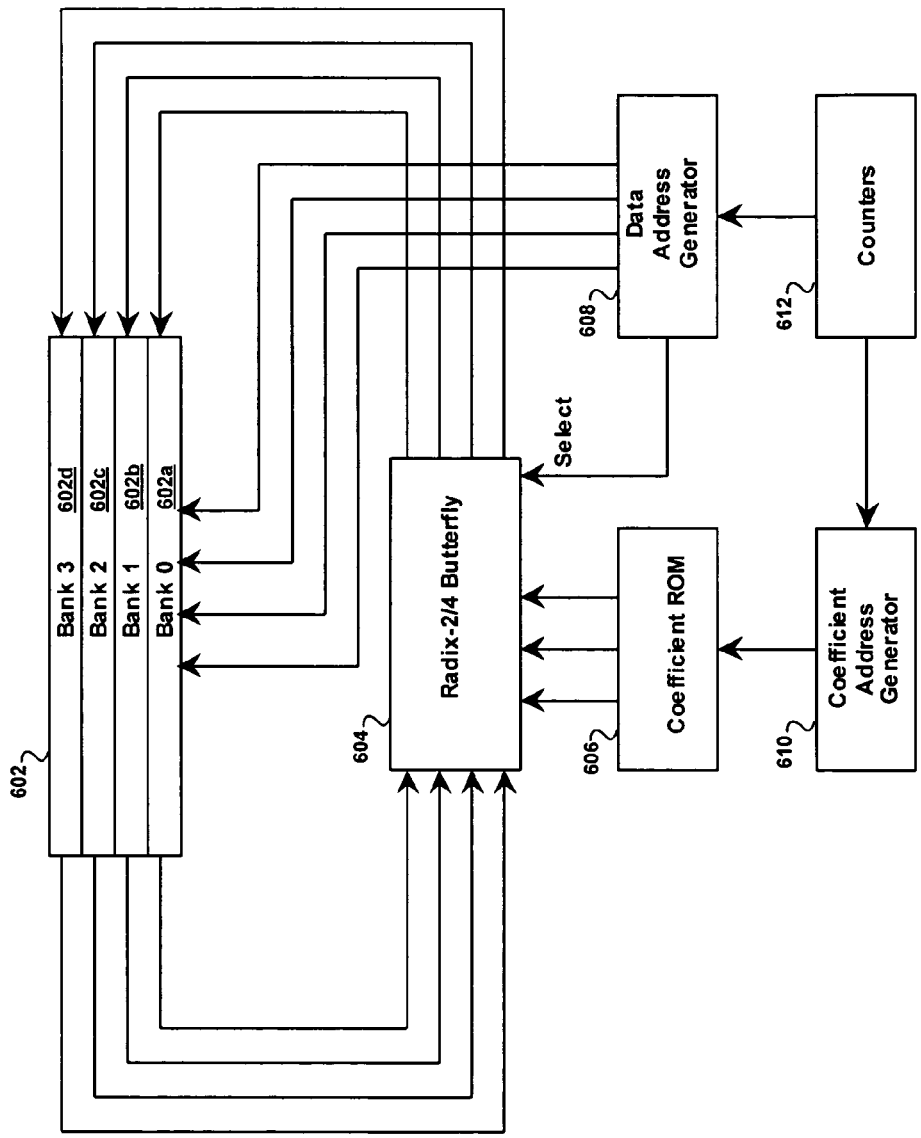
FIG. 6 is a block diagram of an exemplary FFT processor, in accordance with an embodiment of the invention.

FIG. 6 is a block diagram of an exemplary FFT processor, in accordance with an embodiment of the invention. Referring to FIG. 6 there is shown a memory 602, a radix-2 and radix-4 butterfly block 604, a coefficient ROM block 606, a data address generator block 608, a coefficient address generator 610, and a counters block 612. The memory 602 comprises four banks bank 0 602a, bank 1 602b, bank 2 602c, and bank 3 602d. The radix-2 and radix-4 butterfly block 604 may cause each of the four banks 602a, 602b, 602c and 602d to independently and simultaneously store data and/or retrieve stored data. The radix-2 and radix-4 butterfly block 604 may cause the bank 602a to retrieve data stored in the bank 602a. The radix-2 and radix-4 butterfly block 604 may cause the bank 602a to store data in the bank 602a. The radix-2 and radix-4 butterfly block 604 may cause the bank 602b to retrieve data stored in the bank 602b. The radix-2 and radix-4 butterfly block 604 may cause the bank 602b to store data in the bank 602b. The radix-2 and radix-4 butterfly block 604 may cause the bank 602c to retrieve data stored in the bank 602c. The radix-2 and radix-4 butterfly block 604 may cause the bank 602c to store data in the bank 602c. The radix-2 and radix-4 butterfly block 604 may cause he bank 602d to retrieve data stored in the bank 602d. The radix-2 and radix-4 butterfly block 604 may cause the bank 602d to store data in the bank 602d.

The radix-2 and radix-4 butterfly block 604 may implement a radix-2 FFT algorithm or a radix-4 FFT algorithm. The radix-2 and radix-4 butterfly block 604 may retrieve data from memory banks 602a, 602b, 602c and 602d. The radix-2 and radix-4 butterfly block 604 may utilize the retrieved data along with previously retrieved data to compute an intermediate result in connection with radix-2 or radix-4 FFT algorithm. The intermediate result may be stored in one of the memory banks 602a, 602b, 602c, or 602d. The butterfly block 604 may simultaneously compute a plurality of intermediate results, each of which may be stored simultaneously in one of the memory banks 602a, 602b, 602c, or 602d.

The coefficient ROM 606 may store a plurality of twiddle factors that may be utilized to compute intermediate results and/or final results from the corresponding radix-2 or radix-4 FFT algorithm, for example. The data address generator 608 may generate a plurality of addresses that identify an address within a corresponding memory bank 602a, 602b, 602c or 602d, from which data is to be retrieved or stored. The data address generator 608 may also generate a select signal that configures the radix-2 and radix-4 butterfly block 604 to compute an intermediate or final result based on a radix-2 FFT algorithm, or on a radix-4 FFT algorithm. The coefficient address generator 610 may generate a signal that is utilized by the coefficient ROM 606 to select a twiddle factor from the stored plurality of twiddle factors. The counters block 612 may generate a value that is utilized by the data address generator 608 when computing a plurality of addresses that may be utilized by a corresponding memory bank 602a, 602b, 602c, or 602d. The counters block 612 may generate a value that is utilized by the coefficient address generator 610 when computing a signal that may be utilized by the coefficient ROM 606.

Figure 7:
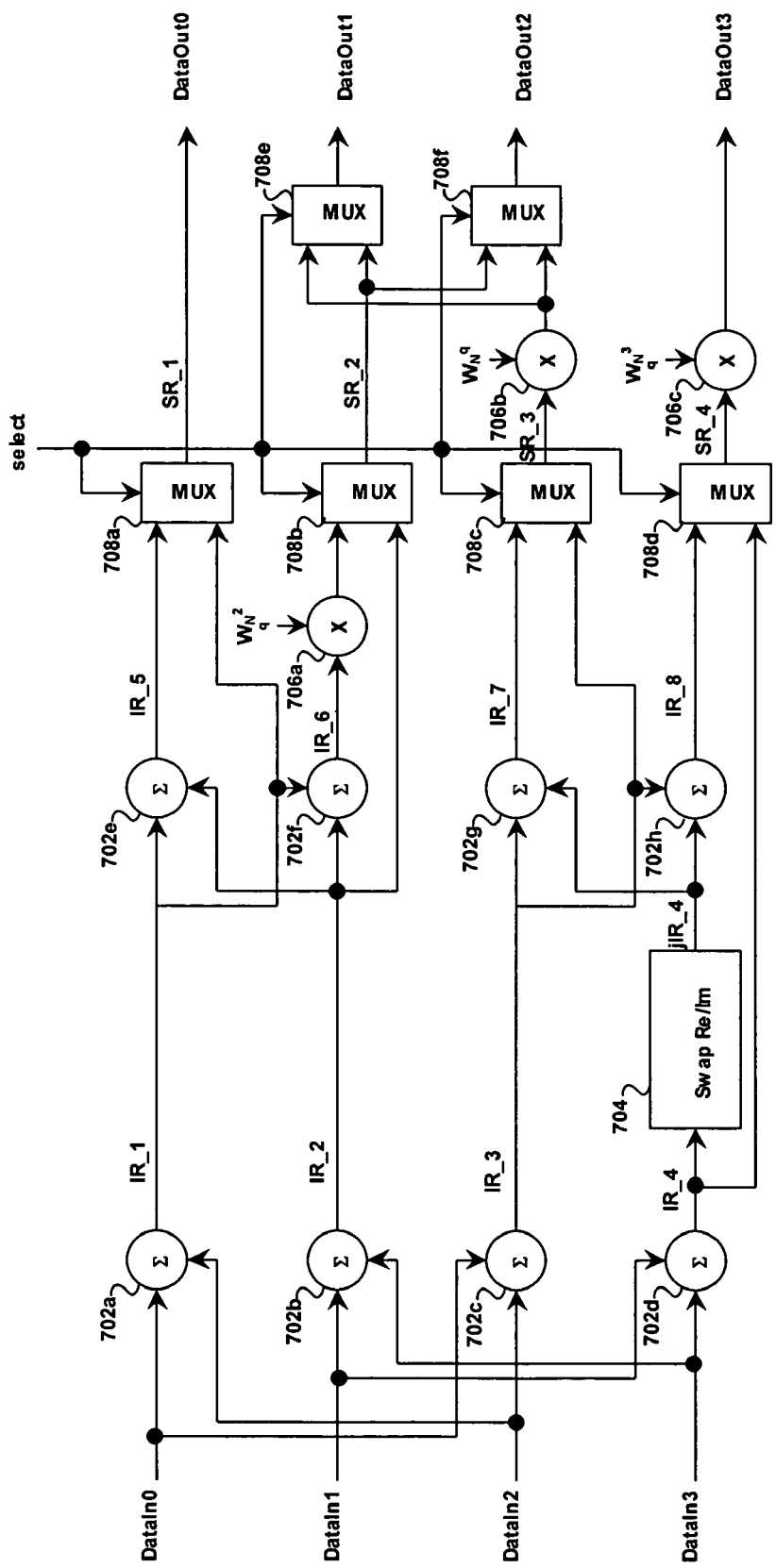
FIG. 7 is a block diagram of an exemplary radix-2 and radix-4 butterfly block, in accordance with an embodiment of the invention.

FIG. 7 is a block diagram of an exemplary radix-2 and radix-4 butterfly block, in accordance with an embodiment of the invention. Referring to FIG. 7 there is shown a plurality of adder blocks 702a, 702b, 702c, 702d, 702e, 702f, 702g and 702h, a real to imaginary swap block 704, a plurality of multiplier blocks 706a, 706b and 706c, and a plurality of multiplexers 708a, 708b, 708c, 708d, 708e and 708f. The inputs DataIn0, DataIn1, DataIn2 and DataIn3 may be retrieved from a memory bank 602a, 602b, 602c or 602d. The outputs DataOut0, DataOut1, DataOut2 and DataOut3 may be stored in a memory bank 602a, 602b, 602c or 602d. The outputs may be results from computations in a current stage in an FFT algorithm implementation. The outputs may represent intermediate results when the current stage is not the final stage in the FFT algorithm. The outputs may represent final results when the current stage is the final stage in the FFT algorithm implementation.

The adder block 702a may receive inputs DataIn0 and DataIn2 and compute an intermediate result IR_1, IR_1=DataIn0+DataIn2. The adder block 702b may receive inputs DataIn1 and DataIn3 and compute an intermediate result IR_2, IR_2=DataIn1+DataIn3. The adder block 702c may receive inputs DataIn0 and DataIn2 and compute an intermediate result IR_3, IR_3=DataIn0−DataIn2. The adder block 702d may receive inputs DataIn1 and DataIn3 and compute an intermediate result IR_4, IR_4=DataIn1−DataIn3. The real to imaginary swap block 704 may convert an intermediate result IR_4 that comprises a real value to an imaginary representation for IR_4, jIR_4.

The adder block 702e may receive inputs IR_1 and IR_2 and compute an intermediate result IR_5, IR_5=IR_1+IR_2. The adder block 702f may receive inputs IR_1 and IR_2 and compute an intermediate result IR_6, IR_6=IR_1−IR_2. The multiplier block 706a may scale IR_6, utilizing a twiddle factor $W_N^{2q}$, to generate a scaled intermediate result $IR\_6*W_N^{2q}$. The adder block 702g may receive inputs IR_3 and jIR_4 and compute a complex intermediate result IR_7, IR_7=IR_3−jIR_4. The adder block 702h may receive inputs IR_3 and jIR_4 and compute a complex intermediate result IR_8, IR_8=IR_3+jIR_4. The real to imaginary swap block 704 may convert an intermediate result IR_4 that comprises a real value to an imaginary representation for IR_4, jIR_4.

The multiplexer 708a may utilize a select signal to select one of the inputs, comprising intermediate results IR_1 and IR_5, which may be coupled to the output selected result SR_1. The selected result SR_1 may be a stage result output DataOut0. The multiplexer 708b may utilize a select signal to select one of the inputs, comprising the intermediate result IR_2 and the scaled intermediate result $IR\_6*W_N^{2q}$, which may be coupled to the output selected result SR_2. The multiplexer 708c may utilize a select signal to select one of the inputs, comprising intermediate results IR_3 and IR_7, which may be coupled to the output selected result SR_3. The multiplier block 706b may scale SR_3, utilizing a twiddle factor $W_N^q$, to generate a scaled selected result $SR\_3*W_N^q$. The value of the exponent, q, may be determined as in equation [1] when the FFT algorithm is a radix-2 implementation. The value of the exponent, q, may be determined as in equation [2] when the FFT algorithm is a radix-4 implementation.

An output from the multiplier block 706b, comprising the scaled selected result $SR\_3*W_N^q$, may be coupled to the stage result output DataOut3. The multiplexer 708d may utilize a select signal to select one of the inputs, comprising intermediate results IR_4 and IR_8, which may be coupled to the output selected result SR_4. The multiplier block 706c may scale SR_4, utilizing a twiddle factor $W_N^{3q}$, to generate a scaled selected result $SR\_4*W_N^{3q}$. The multiplexer 708e may utilize a select signal to select one of the inputs, comprising selected result SR_2 and scaled selected result $SR\_3*W_N^q$, which may be coupled to the stage result output DataOut1. The multiplexer 708f may utilize a select signal to select one of the inputs, comprising selected result SR_2 and scaled selected result $SR\_3*W_N^q$, which may be coupled to the stage result output DataOut2.

Figure 8:
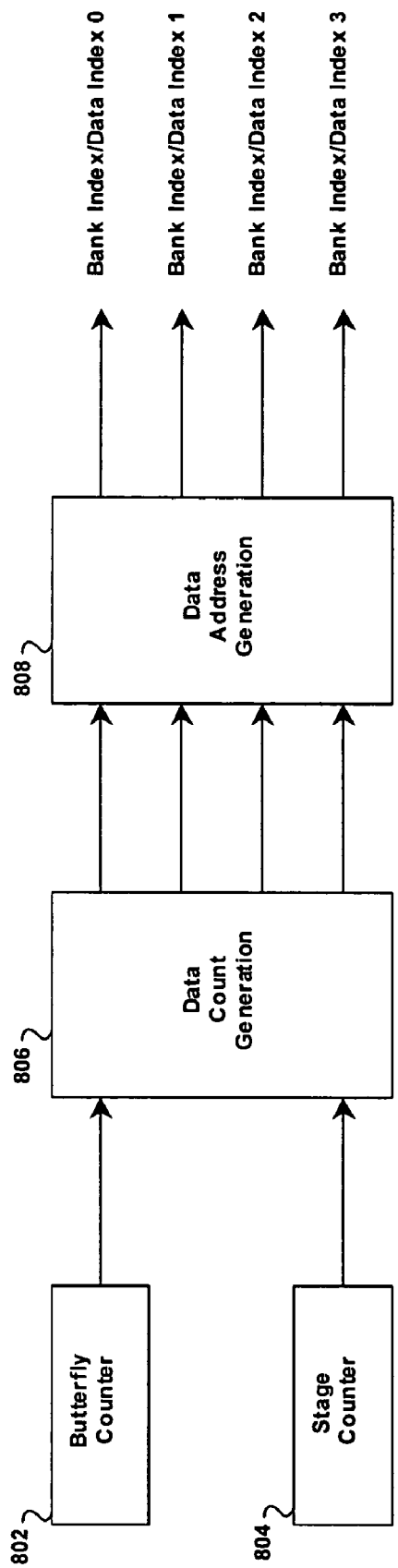
FIG. 8 is a block diagram of an exemplary data address generation block, in accordance with an embodiment of the invention.

FIG. 8 is a block diagram of an exemplary data address generation block, in accordance with an embodiment of the invention. Referring to FIG. 8, there is shown a butterfly counter 802, a stage counter 804, a data count generation block 806, and a data address generation block 808. The data address generation block 808 may compute a bank index and data index 0, a bank index and data index 1, a bank index and data index 2 and a bank index and data index 3. The bank index which of a plurality of memory banks 602a, 602b, 602c and 602d, is to receive the corresponding data index. The data index may indicate a location within the corresponding memory bank. The butterfly counter 802 may indicate a single butterfly 502, among a plurality of butterflies, which are associated with a single stage 402 in an FFT algorithm implementation.

In an exemplary embodiment of the invention, in the FFT implementation illustrated in FIG. 4, a single stage 402, 404 or 406 may comprise 16 butterflies. An individual butterfly within a stage may be numbered 0, 1, 2, ... 15, for example. The stage counter 804 may indicate a single stage, among a plurality of stages 402, 404 or 406, in an FFT algorithm implementation. For example, the FFT implementation illustrated in FIG. 4 may comprise 3 stages. An individual stage may be numbered 0, 1 or 2. The data count generation block 806 may generate a data count value based on a current butterfly number, cb, received from the butterfly counter 802, and a current stage number, cs, received from the stage counter 804. The data count generation block 806 may generate a data count value for each wing within the current butterfly and within the current stage. The wing may be identified by a wing number, nw. For example, in the FFT implementation illustrated in FIG. 4, a butterfly 502 may comprise 4 wings. An individual wing within a butterfly may be numbered 0, 1, 2 or 3, for example.

For an exemplary radix-4 FFT algorithm, the data count generation block 806 may generate data count values as indicated in the following table:

| Butterfly Counter | Stage Counter 0 | 1 | 2 |
|---|---|---|---|
| $[0\ 0]_4$ | $[nw\ 0\ 0]_4$ | $[0\ nw\ 0]_4$ | $[0\ 0\ nw]_4$ |
| $[0\ 1]_4$ | $[nw\ 0\ 1]_4$ | $[0\ nw\ 1]_4$ | $[0\ 1\ nw]_4$ |
| $[0\ 2]_4$ | $[nw\ 0\ 2]_4$ | $[0\ nw\ 2]_4$ | $[0\ 2\ nw]_4$ |
| $[0\ 3]_4$ | $[nw\ 0\ 3]_4$ | $[0\ nw\ 3]_4$ | $[0\ 3\ nw]_4$ |
| $[1\ 0]_4$ | $[nw\ 1\ 0]_4$ | $[1\ nw\ 0]_4$ | $[1\ 0\ nw]_4$ |
| $[1\ 1]_4$ | $[nw\ 1\ 1]_4$ | $[1\ nw\ 1]_4$ | $[1\ 1\ nw]_4$ |
| $[1\ 2]_4$ | $[nw\ 1\ 2]_4$ | $[1\ nw\ 2]_4$ | $[1\ 2\ nw]_4$ |
| $[1\ 3]_4$ | $[nw\ 1\ 3]_4$ | $[1\ nw\ 3]_4$ | $[1\ 3\ nw]_4$ |
| $[2\ 0]_4$ | $[nw\ 2\ 0]_4$ | $[2\ nw\ 0]_4$ | $[2\ 0\ nw]_4$ |
| $[2\ 1]_4$ | $[nw\ 2\ 1]_4$ | $[2\ nw\ 1]_4$ | $[2\ 1\ nw]_4$ |
| $[2\ 2]_4$ | $[nw\ 2\ 2]_4$ | $[2\ nw\ 2]_4$ | $[2\ 2\ nw]_4$ |
| $[2\ 3]_4$ | $[nw\ 2\ 3]_4$ | $[2\ nw\ 3]_4$ | $[2\ 3\ nw]_4$ |
| $[3\ 0]_4$ | $[nw\ 3\ 0]_4$ | $[3\ nw\ 0]_4$ | $[3\ 0\ nw]_4$ |
| $[3\ 1]_4$ | $[nw\ 3\ 1]_4$ | $[3\ nw\ 1]_4$ | $[3\ 1\ nw]_4$ |
| $[3\ 2]_4$ | $[nw\ 3\ 2]_4$ | $[3\ nw\ 2]_4$ | $[3\ 2\ nw]_4$ |
| $[3\ 3]_4$ | $[nw\ 3\ 3]_4$ | $[3\ nw\ 3]_4$ | $[3\ 3\ nw]_4$ |

In the table above, each entry may be a base 4 numerical representation. For example, the base 4 number represented as $20_4$ may be represented as 16 in base 10. Each row may represent a count value for a butterfly within a stage. Each column may represent a count value for a stage. For each combination of a butterfly counter value and a stage counter value a plurality of data count values may be generated. The number of data count values may be based on the number of wings, nw, within the current butterfly, and within the current stage. For example, for butterfly number 0 in stage number 0, the count values that may be generated by the data count generation block 806 may comprise $0_4$, $100_4$, $200_4$ and $300_4$. The base 10 representations of these numbers may be 0, 16, 32 and 48 respectively. For example, for butterfly number 1 in stage number 1, the count values that may be generated by the data count generation block 806 may comprise $1_4$, $11_4$, $101_4$ and $111_4$. The base 10 representations of these numbers may be 1, 5, 9 and 13 respectively. Each of the numbers may correspond to an input sample as shown in FIG. 4. For example, the data count value 0 may correspond to input sample x(0) 408a.

The data count generation block 806 may communicate a plurality of data count values to the data address generation block 808. The number of data count values may correspond to the number of memory banks 602a, 602b, 602c or 602d. The data address generation block 808 may utilize at least a portion of the data count values to generate an address that identifies a location in a corresponding memory bank. The address may correspond to a location within the corresponding memory bank to which an intermediate result is to be written or from which an intermediate result is to be retrieved, for example.

In some conventional implementations of a radix-2 or radix-4 FFT algorithm, the twiddle factors may be stored in memory 106. This may require that the memory 106 be large enough to accommodate the complex number representations for each of the twiddle factors that are utilized in the implementation of the FFT algorithm. Furthermore, complex multiplication operations may be performed when a twiddle factor is utilized as a scale factor. Various embodiments of the invention may utilize a coordinate rotation digital computer (CORDIC), which may be utilized to implement twiddle factor scaling as a complex vector rotation of an intermediate result or selected result generated by the FFT algorithm. The angle of vector rotation may be computed based on values contained in the butterfly counter 802 and stage counter 804.

Figure 9A:
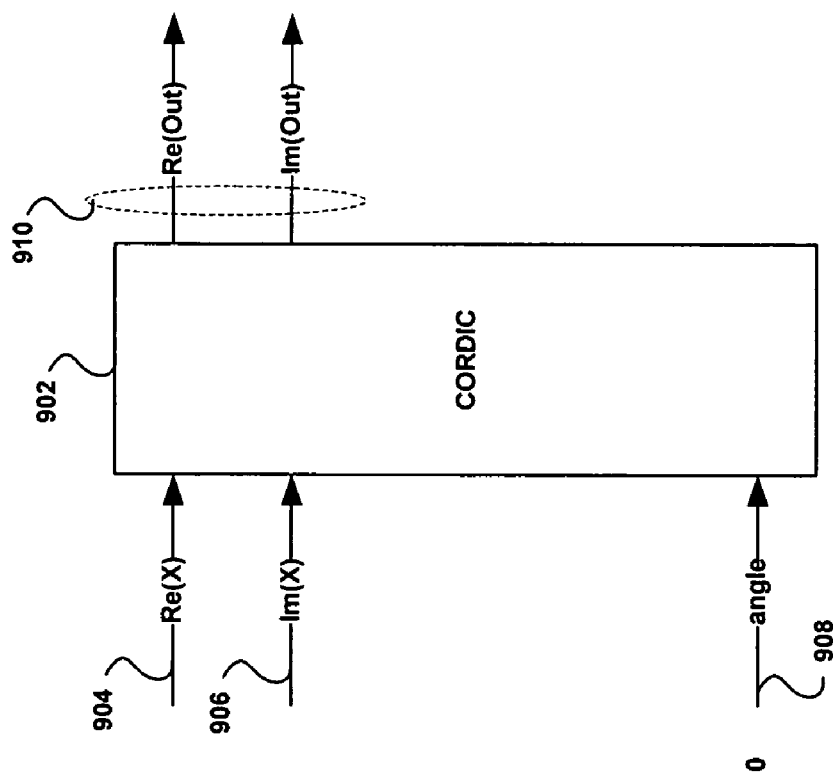
FIG. 9a is a block diagram of an exemplary CORDIC, which may be utilized in connection with an embodiment of the invention.

FIG. 9a is a block diagram of an exemplary CORDIC, which may be utilized in connection with an embodiment of the invention. Referring to FIG. 9a, there is shown a CORDIC 902, a real component of a complex input value X 904, an imaginary component of X 906, an angle input 908, and an output vector 910. The CORDIC 902 may comprise suitable circuitry, logic and/or code and may be adapted to perform mathematical operations on an input vector and/or angle value utilizing arctangent look-up tables, for example. The CORDIC 902 may receive a complex representation of an input value comprising a real component 904 and an imaginary component 906. The CORDIC 902 may also receive an angle input 908. The CORDIC 902 may construct a complex vector representation of X based on the real component 904 and imaginary component 906. The CORDIC 902 may compute a vector representation of the output vector 910 by rotating the vector rotation X based on the angle input 908. The CORDIC 902 may generate an output vector 910 comprising a real component, Re(Out), and an imaginary component, Im(Out).

Figure 9B:
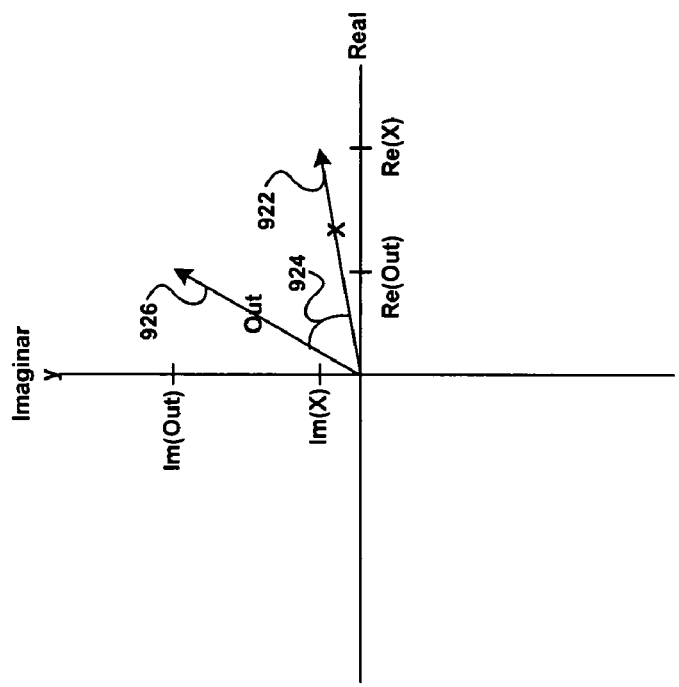
FIG. 9b is diagram illustrating exemplary vector rotation, which may be utilized in connection with an embodiment of the invention.

FIG. 9b is diagram illustrating exemplary vector rotation, which may be utilized in connection with an embodiment of the invention. Referring to FIG. 9b, there is shown an input vector X 922, an angle of rotation 924, and an output vector Out 926. The input vector X 922 may be represented by a real component Re(X) and an imaginary component Im(X). The after rotation, the output vector Out 926 may be represented by a real component Re(Out) and an imaginary component Im(Out).

In operation, the CORDIC 902 may receive an input Re(X) 904 and Im(X) 906 as a complex representation of an intermediate result or selected result, such as IR_6 or SR_3 (FIG. 7). The CORDIC 902 may also receive an angle input 908 comprising a computed angle based on a value in the butterfly counter 802 and in the stage counter 804. The angle input 908 may be computed based on an arctangent function. The CORDIC 902 may compute a value that is approximately equal to a scaled intermediate result and/or scaled selected result, for example $W_N^{2q}*IR\_6$.

Various embodiments of the invention may be utilized in a variety of signal processing applications such as for echo cancellation and/or noise cancellation in a Bluetooth wireless headset. Echo cancellation functions may comprise finite impulse response (FIR) filtering and filter adaptation. An example of filter adaptation may be least mean square adaptation. Noise cancellation functions may comprise windowing, frequency transformation, and power estimation.

Figure 10:
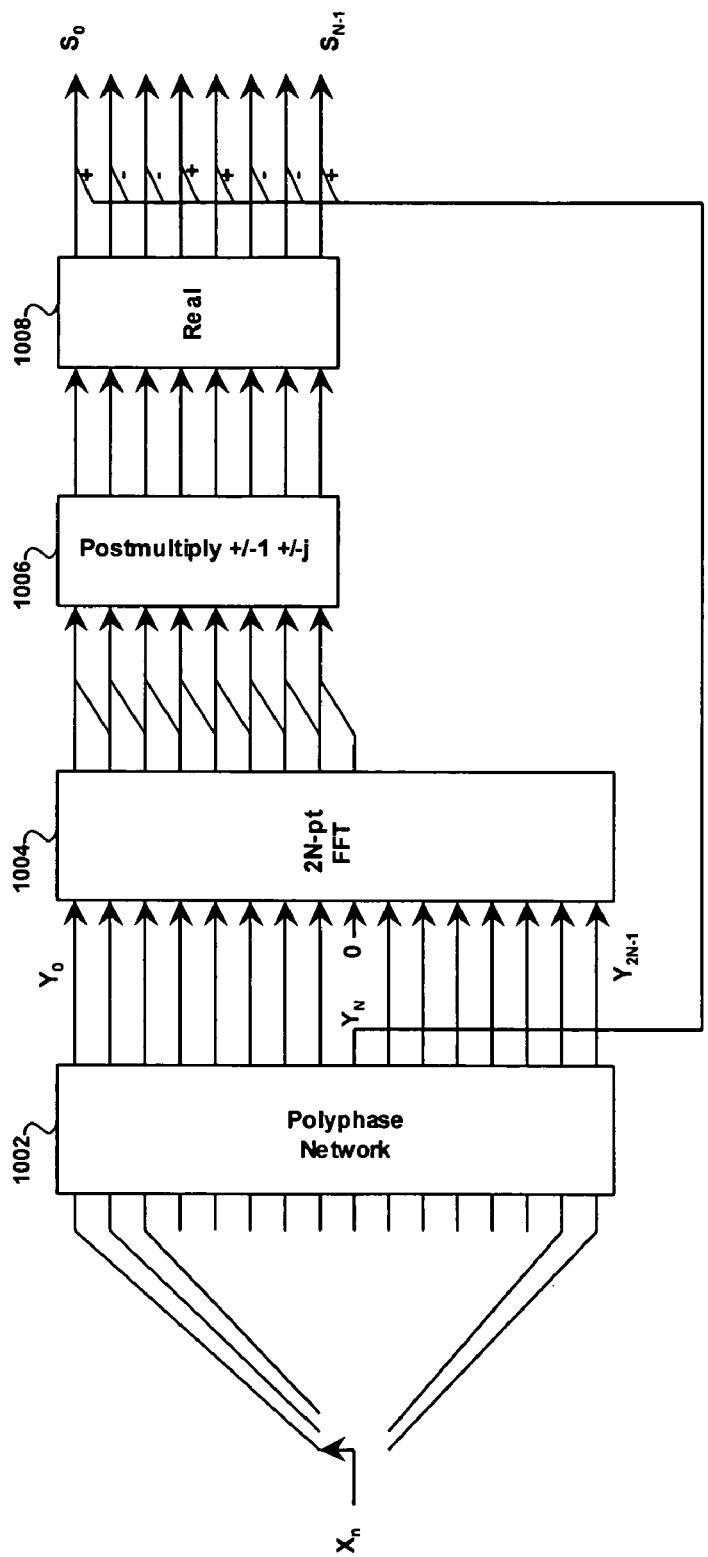
FIG. 10 is a block diagram of an exemplary system for Bluetooth sub band analysis and coding, in accordance with an embodiment of the invention.

FIG. 10 is a block diagram of an exemplary system for Bluetooth subband analysis and coding, in accordance with an embodiment of the invention. Referring to FIG. 10, there is shown a polyphase network 1002, a 2N point FFT block 1004, a postmultiply block 1006, and a real component processing block 1008. The polyphase network 1002 may be implemented as specified in the Bluetooth specification of the advanced audio distribution profile. The polyphase network 1002 may receive a plurality of digitized input samples $X_n$, comprising audio and/or video information.

When performing subband coding (SBC), the polyphase network 1002 may encode the digitized input samples to generate a plurality of encoded samples $Y_0 \ldots Y_{2N-1}$. The 2N point FFT block 1004 may receive the encoded samples, $Y_0 \ldots Y_{N-1}$ and $Y_{N+1} \ldots Y_{2N-1}$. The 2n point FFT block 1004 may receive a sample $Y_N=0$, for example. The 2N point FFT block 1004 may implement an FFT algorithm that comprises a number of points based on the number of encoded samples computed by the polyphase network 1002. The variable N may represent an integer that comprises a value in connection to the number of digitized input samples $X_N$. The 2N point FFT block 1004 may be implemented utilizing a radix-2 and radix-4 butterfly block 604, in accordance with an embodiment of the invention.

The 2N point FFT block 1004 may generate a plurality of outputs that may be received by the postmultiply block 1006. For a given plurality of 2N inputs, the 2N point FFT block 1004 may generate a plurality of less than 2N outputs. The postmultiply block 1006 may multiply each of the received inputs by a complex quantity, which may comprise a value of 1+j, 1−j, −1+j or −1−j, for example. After multiplication by the appropriate complex quantity, the postmultiply block 1006 may generate a plurality of outputs that may be received by the real component processing block 1008. The real component processing block 1008 may extract a real component from each of a plurality of received complex inputs. For example, if the real component processing block 1008 receives a complex input value A+jB, the extracted real component may be approximately equal to A. The value of the encoded output, $Y_N$, from the polyphase network 1002 may be added to a portion of the extracted real components output from the real component processing block 1008. The value of the encoded output, $Y_N$, from the polyphase network 1002 may be subtracted from a subsequent portion of the extracted real components that are generated as an output from the real component processing block 1008.

When performing SBC analysis, the polyphase network 1002 may decode the digitized input samples to generate a plurality of decoded samples $Y_0 \ldots Y_{2N-1}$. The 2N point FFT block 1004 may receive the decoded samples, $Y_0 \ldots Y_{N-1}$ and $Y_{N+1} \ldots Y_{2N-1}$. The 2n point FFT block 1004 may receive a sample $Y_N=0$, for example. The 2N point FFT block 1004 may implement an FFT algorithm that comprises a number of points based on the number of decoded samples computed by the polyphase network 1002. The 2N point FFT block 1004 may be implemented utilizing a radix-2 and radix-4 butterfly block 604, in accordance with an embodiment of the invention.

The 2N point FFT block 1004 may generate a plurality of outputs that may be received by the postmultiply block 1006. The number of outputs generated by the 2N point FFT block 1004 may comprise a portion of the number of received inputs. The postmultiply block 1006 may multiply each of the received inputs by a complex quantity that comprises a value of 1+j, 1−j, −1+j or −1−j, for example. After multiplication by the appropriate complex quantity, the postmultiply block 1006 may generate a plurality of outputs that may be received by the real component processing block 1008. The real component processing block 1008 may extract a real component from each of a plurality of received complex inputs. The value of the decoded output, $Y_N$, from the polyphase network 1002 may be added to a portion of the extracted real components that are generated as an output from the real component processing block 1008. The value of the decoded output, $Y_N$, from the polyphase network 1002 may be subtracted from a subsequent portion of the extract real components that are generated as an output from the real component processing block 1008.

A computational comparison between some conventional methods of SBC coding and/or analysis, and comparable methods when implemented utilizing various embodiments of the invention is illustrated in the following tables. The following table compares the number of complex multiplication and addition operations for SBC coding and/or analysis using 4 subbands, for example:

| 4 Subband | Multiplication | Addition |
|---|---|---|
| DCT | 32 | 28 |
| FCT | 12 | 29 |
| FFT (8-pt real) | 12 CORDIC rotations | 60 |
| FFT (4-pt complex) | 8 CORDIC rotations | 58 |
| FFT (8-pt complex) | 6 CORDIC rotations | 40 |

The first row in the above table indicates that a discrete cosine transform (DCT) may perform 32 complex multiplications and 28 additions, for example. The second row in the above table indicates that a fast cosine transform (FCT) may utilize 12 complex multiplications and 29 additions, for example. The third row in the above table indicates that an 8-point real FFT, performed in accordance with an embodiment of the invention may utilize 12 CORDIC rotations, instead of performing complex multiplications, and 60 additions. A real FFT may compute a final result that comprises a real component. The fourth row in the above table indicates that a 4-point complex FFT, performed in accordance with an embodiment of the invention may utilize 8 CORDIC rotations, and 58 additions. A complex FFT may compute a final result that comprises a real component and an imaginary component. The fifth row in the above table indicates that an 8-point complex FFT, performed in accordance with an embodiment of the invention may utilize 6 CORDIC rotations, and 40 additions.

The following table compares the number of complex multiplication and addition operations for SBC coding and/or analysis for 8 sub bands, for example:

| 8 Subband | Multiplication | Addition |
|---|---|---|
| DCT | 128 | 120 |
| FCT | 32 | 81 |
| FFT (16-pt real) | 32 CORDIC rotations | 160 |
| FFT (8-pt complex) | 20 CORDIC rotations | 130 |
| FFT (16-pt complex) | 16 CORDIC rotations | 96 |

The first row in the above table indicates that a DCT may utilize 128 complex multiplications and 120 additions, for example. The second row in the above table indicates that a FCT may utilize 32 complex multiplications and 81 additions, for example. The third row in the above table indicates that a 16-point real FFT, performed in accordance with an embodiment of the invention may utilize 32 CORDIC rotations, and 160 additions. The fourth row in the above table indicates that an 8-point complex FFT, performed in accordance with an embodiment of the invention may utilize 20 CORDIC rotations, and 130 additions. The fifth row in the above table indicates that a 16-point complex FFT, performed in accordance with an embodiment of the invention may utilize 16 CORDIC rotations, and 96 additions.

Figure 11:
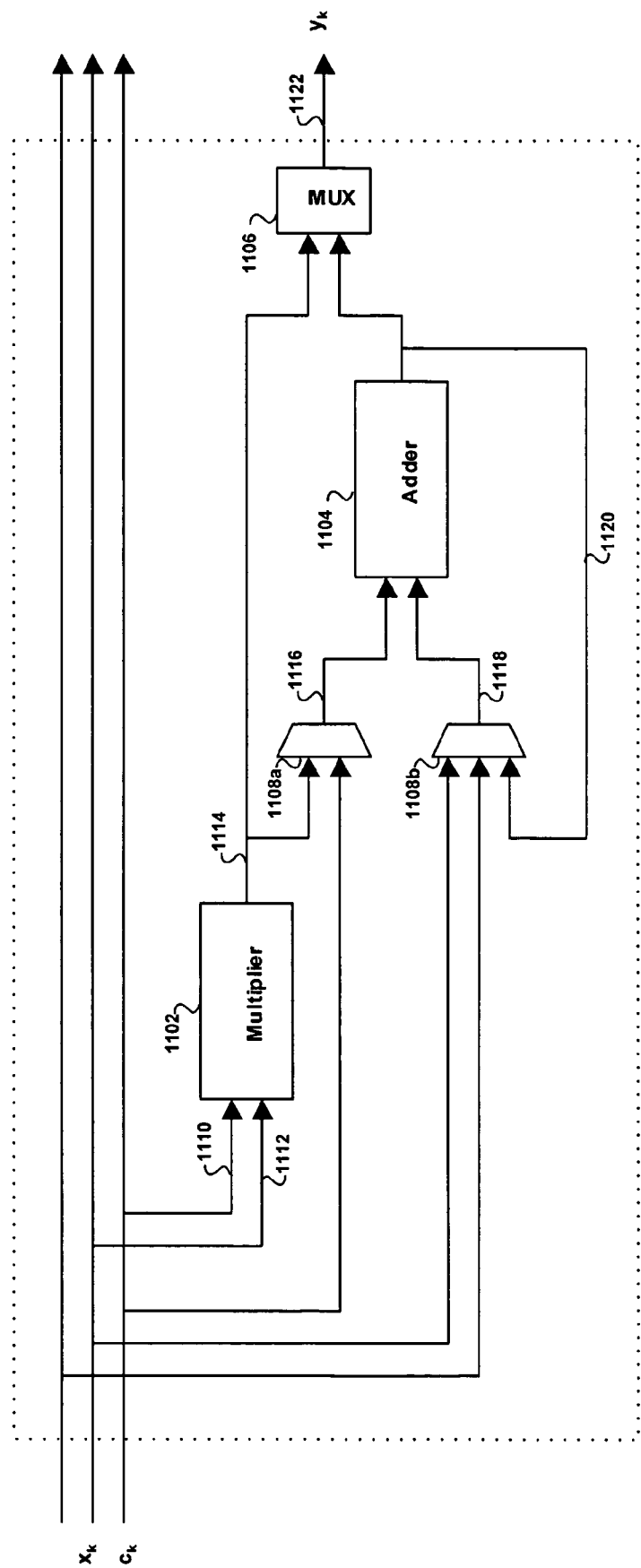
FIG. 11 is a block diagram of an exemplary system for FIR filtering, which may be utilized in accordance with an embodiment of the invention.

Various embodiments of the invention may provide a flexible hardware accelerator 102 platform that may be adapted to a variety of applications. FIG. 11 is a block diagram of an exemplary system for FIR filtering, which may be utilized in accordance with an embodiment of the invention. Referring to FIG. 11, there is shown a multiplier 1102, an adder 1104, an output multiplexer 1106, a plurality of intermediate multiplexers 1108a and 1108b, and a plurality of data paths 1110, 1112, 1114, 1116, 1118, 1120 and 1122. The multiplier 1102 may receive an input $x_k$ via a data path 1110, and a coefficient $c_k$ via a data path 1112, for example. The multiplier 1102 may compute a result, whose value is approximately equal to $x_k c_k$, that is output via the data path 1114.

The selector 1108a may select the output from the data path 1114. The output may be coupled to the data path 1116. The adder 1104 may receive an input from the data path 1116 and an input received from the data path 1118. The adder 1104 may compute a result, whose value is approximately equal to the sum of the received inputs that are output via the data path 1120. The output multiplexer 1106 may select the output from the data path 1120. The output may be coupled to the data path 1122. The selector 1108b may select the output from the data path 1120. The output may be coupled to the data path 1118. The value of the output that is communicated to the data path 1118 may correspond to an output value that was previously computed by the adder 1104. The FIR filtering algorithm may receive a plurality of input samples $x_k$ and may compute an output value $y_k$ based on a plurality of N recent samples and/or coefficients. The relationship may be expressed as:

$$y_k = \sum_{i=0}^{N} c_{k-i} x_{k-i}.$$

With reference to FIG. 7, in various embodiments of the invention, one or more multipliers 706 may be adapted to perform the function of the multiplier 1102. One or more adders 702 may be adapted to perform the function of the adder 1104. One or more of the multiplexers 708 may be adapted to perform the function of the intermediate multiplexers 1108, and output multiplexer 1106. The select input to the multiplexers 708 may be utilized to establish the data paths 1110, 1112, 1114, 1116, 1118, 1120 and 1122. A data output, for example DataOut0, which is coupled to the multiplexer 708a, may be coupled to a data input, for example DataIn1, which is coupled to the adder 702b.

Figure 12:
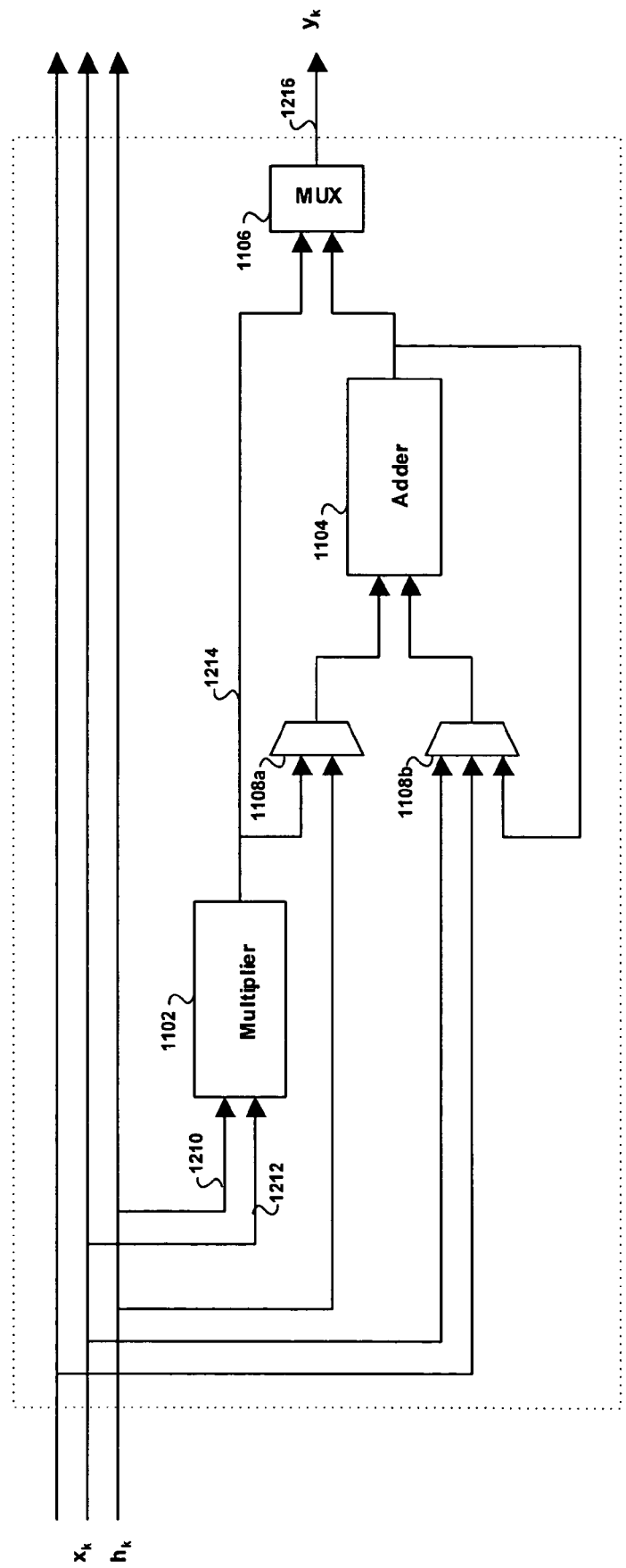
FIG. 12 is a block diagram of an exemplary system for windowing, which may be utilized in accordance with an embodiment of the invention.

FIG. 12 is a block diagram of an exemplary system for windowing, which may be utilized in accordance with an embodiment of the invention. Referring to FIG. 12, there is shown a multiplier 1102, an adder 1104, an output multiplexer 1106, a plurality of intermediate multiplexers 1108a and 1108b, and a plurality of data paths 1210, 1212, 1214 and 1216. The windowing algorithm may receive a plurality of input samples $x_k$, and windowing coefficients $h_k$. The windowing algorithm may compute an output value $y_k$ based on a relationship that may be expressed: $y_k = h_k x_k$. The output value $y_k$ may be approximately equal to 0 when the windowing coefficient $h_k$ is approximately equal to 0. The value of the windowing coefficient $h_k$ may not be equal to 0 during an interval approximately defined by k>0 to k<N. The value of the windowing coefficient $h_k$ may be approximately equal to 0 otherwise.

In various embodiments of the invention, one or more multipliers 706 may be adapted to perform the function of the multiplier 1102. One or more of the multiplexers 708 may be adapted to perform the function of the output multiplexer 1106. The select input to the multiplexers 708 may be utilized to establish the data paths 1210, 1212, 1214 and 1216.

Figure 13:
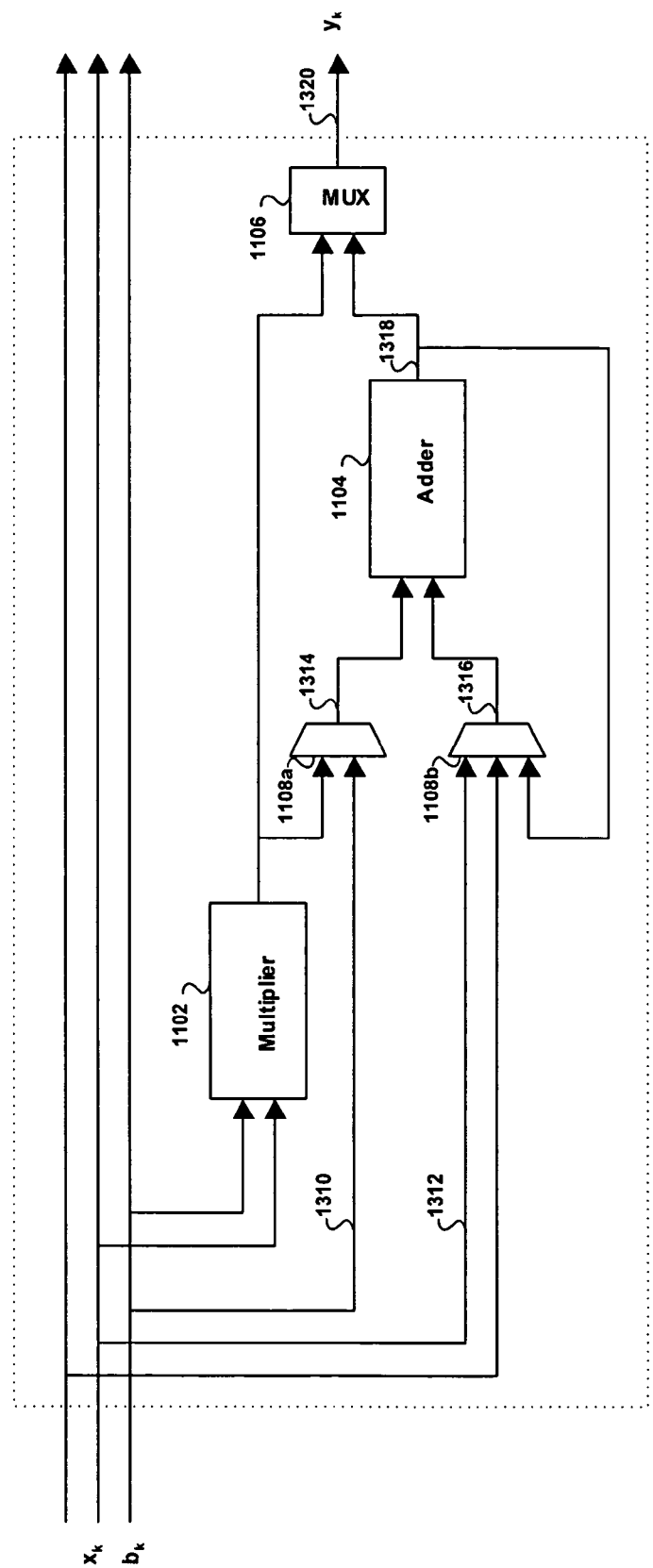
FIG. 13 is a block diagram of an exemplary system for frame overlap reconstruction, which may be utilized in accordance with an embodiment of the invention.

FIG. 13 is a block diagram of an exemplary system for frame overlap reconstruction, which may be utilized in accordance with an embodiment of the invention. Referring to FIG. 13, there is shown a multiplier 1102, an adder 1104, an output multiplexer 1106, a plurality of intermediate multiplexers 1108a and 1108b, and a plurality of data paths 1310, 1312, 1314, 1316, 1318 and 1320. The selector 1108a may receive an input $x_k$ via a data path 1310. The selector 1108b may receive an overlap frame input $b_k$ via a data path 1312, for example. The selector 1108a may select the input from the data path 1310. The input may be coupled to the data path 1314. The selector 1108b may select the input from the data path 1312. The input may be coupled to the data path 1314. The adder 1104 may receive an input from the data path 1114 and an input received from the data path 1116. The adder 1104 may compute a result, whose value is approximately equal to the sum of the received inputs, that is output via the data path 1318. The output multiplexer 1106 may select the output from the data path 1318. The output may be coupled to the data path 1320. The frame overlap reconstruction algorithm may receive a plurality of input samples $x_k$, and overlap frame input samples $b_k$. The frame overlap reconstruction algorithm may compute an output value $y_k$ based on a relationship that may be expressed: $y_k = b_k + x_k$.

In various embodiments of the invention, one or more adders 702 may be adapted to perform the function of the adder 1104. One or more of the multiplexers 708 may be adapted to perform the function of the intermediate multiplexers 1108, and output multiplexer 1106. The select input to the multiplexers 708 may be utilized to establish the data paths 1310, 1312, 1314, 1316, 1318 and 1320.

Figure 14:
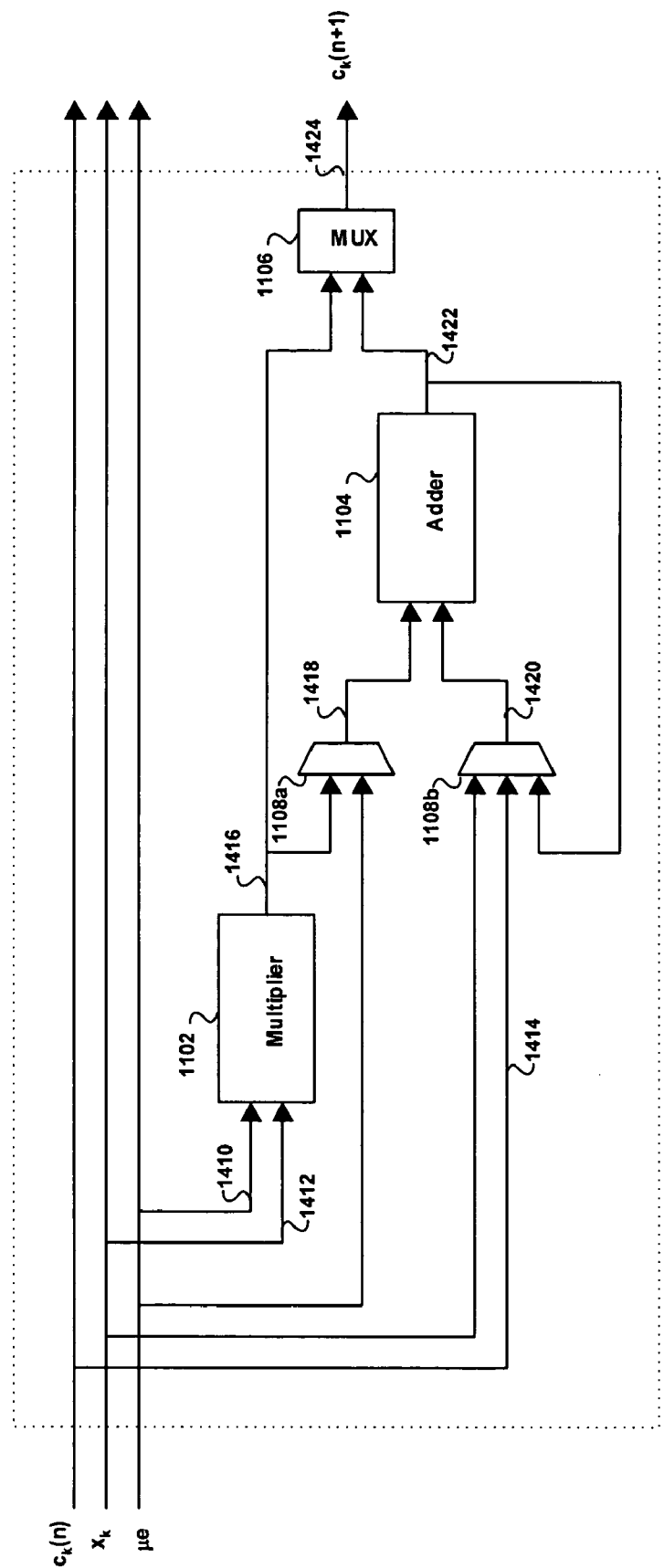
FIG. 14 is a block diagram of an exemplary system for least mean square adaptation, which may be utilized in accordance with an embodiment of the invention.

FIG. 14 is a block diagram of an exemplary system for least mean square adaptation, which may be utilized in accordance with an embodiment of the invention. Referring to FIG. 14, there is shown a multiplier 1102, an adder 1104, an output multiplexer 1106, a plurality of intermediate multiplexers 1108a and 1108b, and a plurality of data paths 1410, 1412, 1414, 1416, 1418, 1420, 1422 and 1424. The multiplier 1102 may receive an input $x_k$ via a data path 1412, and an error coefficient $\mu e$ via a data path 1410, for example. The multiplier 1102 may compute a result, whose value is approximately equal to $x_k \mu e$, which is output via the data path 1416.

The selector 1108a may select the output from the data path 1416. The output from the data path 1416 may be coupled to the data path 1418. The selector 1108b may receive a sample $c_k(n)$ via a data path 1414. The selector 1108b may select the received sample from the data path 1414. The received sample may be coupled to the data path 1420. The adder 1104 may receive an input from the data path 1418 and an input received from the data path 1420. The adder 1104 may compute a result, whose value is approximately equal to the sum of the received inputs, which is output via the data path 1422. The output multiplexer 1106 may select the output from the data path 1422. The output may be coupled to the data path 1424. The least mean square (LMS) adaptation algorithm may receive a plurality of input samples $x_k$ and $c_k(n)$. The LMS adaptation algorithm may compute an output value $c_k(n+1)$ based on a relationship:

$$c_k(n+1) = c_k(n) + \mu e^* x_k.$$

In various embodiments of the invention, one or more multipliers 706 may be adapted to perform the function of the multiplier 1102. One or more adders 702 may be adapted to perform the function of the adder 1104. One or more of the multiplexers 708 may be adapted to perform the function of the intermediate multiplexers 1108, and output multiplexer 1106. The select input to the multiplexers 708 may be utilized to establish the data paths 1410, 1412, 1414, 1416, 1418, 1420, 1422 and 1424.

Figure 15:
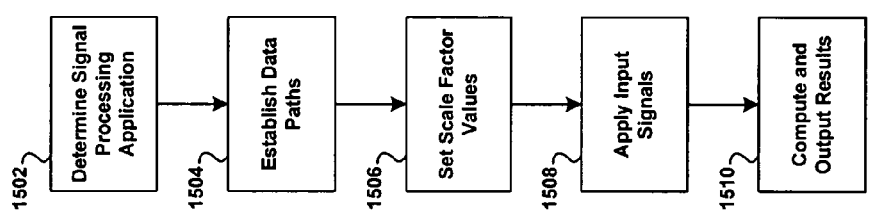
FIG. 15 is a flow chart illustrating exemplary steps for adaptive FFT processing in a Bluetooth wireless headset, in accordance with an embodiment of the invention.

FIG. 15 is a flow chart illustrating exemplary steps for adaptive FFT processing in a Bluetooth wireless headset, in accordance with an embodiment of the invention. Referring to FIG. 15, in step 1502 the application to be performed by the hardware accelerator 102 may be determined. The hardware accelerator may perform one of a plurality of signal processing functions. In step 1504, one or more data paths through the hardware accelerator 102 may be established by configuring the select input to one or more multiplexers 708. In step 1506, values for one or more scale factors may be set. This may comprise determining the scale factor that is to be utilized by one or more multipliers 706. In step 1508, signal inputs may be applied to the inputs of the hardware accelerator 102. The signal inputs may be as required for the signal processing application. In step 1510, the hardware accelerator 102 computes and outputs results.

A system for processing a signal may comprise a hardware accelerator 102 that configures circuitry within a single chip to establish at least one of a plurality of data paths for processing input data for a plurality of signal processing algorithms for implementing a subband codec (SBC). The hardware accelerator 102 may execute, via the circuitry within the single chip, vector rotation of data during processing within one or more of the plurality of data paths. The hardware accelerator 102 may swap a real component and an imaginary component, of the input data and/or data. The hardware accelerator 102 may compute a result based on applying at least one vector rotation to the input data and/or data. The result may be approximately equal to a multiplication applied to the input data and/or data.

The hardware accelerator 102 may determine the vector rotation based on a butterfly counter 802 and/or a stage counter 804. The hardware accelerator 102 may also compute a plurality of memory bank addresses based on the butterfly counter 802 and/or the stage counter 804. A plurality of input data may be retrieved simultaneously from a plurality of memory banks 602 based on a corresponding one of the plurality of memory bank addresses. A plurality of intermediate result data may be stored simultaneously to a plurality of memory banks 602 based on the corresponding plurality of memory bank addresses. The hardware accelerator 102 may select at least one addition operation to be applied to the input data and/or data received via the at least one of a plurality of data paths. The plurality of signal processing algorithms may comprise a radix-2 fast Fourier transform, a radix-4 fast Fourier transform, a radix-2 discrete Fourier transform, a radix-4 discrete Fourier transform, a discrete cosine transform, and/or a fast cosine transform.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a signal, the method comprising:
    configuring a plurality of data paths in one or more circuits within a single chip, wherein said plurality of data paths is selected from a plurality of candidate data paths;
    processing input data, by selectively performing one or more of a plurality of operations comprising discrete cosine transform operations, fast cosine transform operations and fast Fourier transform operations based on said configuring said plurality of data paths, to implement a subband codec (SBC); and
    executing, via said one or more circuits within said single chip, vector rotation of data during processing within at least one of said plurality of data paths.

2. The method according to claim 1, comprising swapping at least one of the following: a real component and an imaginary component, of one or both of said input data and said data.

3. The method according to claim 1, comprising computing a result based on applying at least one said vector rotation to one or both of said input data and said data.

4. The method according to claim 3, wherein said result is approximately equal to a multiplication applied to said one or both of said input data and said data.

5. The method according to claim 1, comprising determining said vector rotation based on one or both of a butterfly counter and a stage counter.

6. The method according to claim 5, comprising computing a plurality of memory bank addresses based on said one or both of a butterfly counter and a stage counter.

7. The method according to claim 6, comprising retrieving a plurality of said input data simultaneously from a plurality of memory banks based on a corresponding said plurality of memory bank addresses.

8. The method according to claim 6, comprising storing a plurality of intermediate result data simultaneously to a plurality of memory banks based on a corresponding said plurality of memory bank addresses.

9. The method according to claim 1, comprising selecting at least one addition to be applied to one or both of said input data and said data received via said at least one of said plurality of data paths.

10. The method according to claim 1, comprising selectively performing one or more of a plurality of operations comprising finite impulse response filtering operations, windowing operations, frame overlap reconstruction operations and least mean square adaptation operations based on said configuring said data paths.

11. A system for processing a signal, the system comprising:
    a hardware accelerator comprising a single chip that is operable to configure a plurality of data paths in one or more circuits within said single chip, wherein said plurality of data paths is selected from a plurality of candidate data paths;
    said hardware accelerator is operable to process input data, by selectively performing one or more of a plurality of operations comprising discrete cosine transform operations, fast cosine transform operations and fast Fourier transform operations based on said configuring said plurality of data paths, to implement a subband codec (SBC); and said hardware accelerator is operable to execute, via said one or more circuits within said single chip, of vector rotation of data during processing within at least one of said plurality of data paths.

12. The system according to claim 11, wherein said hardware accelerator is operable to swap one or both of a real component and an imaginary component, of one or both of said input data and said data.

13. The system according to claim 11, wherein said hardware accelerator is operable to compute a result based on applying at least one said vector rotation to one or both of said input data and said data.

14. The system according to claim 13, wherein said result is approximately equal to a multiplication applied to said one or both of said input data and said data.

15. The system according to claim 11, wherein said hardware accelerator is operable to determine said vector rotation based on one or both of a butterfly counter and a stage counter.

16. The system according to claim 15, wherein said hardware accelerator is operable to computes a plurality of memory bank addresses based on said one or both of a butterfly counter and a stage counter.

17. The system according to claim 16, wherein said hardware accelerator is operable to retrieve a plurality of said input data simultaneously from a plurality of memory banks based on a corresponding said plurality of memory bank addresses.

18. The system according to claim 16, wherein said hardware accelerator is operable to store a plurality of intermediate result data simultaneously to a plurality of memory banks based on a corresponding said plurality of memory bank addresses.

19. The system according to claim 11, wherein said hardware accelerator is operable to select at least one addition to be applied to one or both of said input data and said data received via said at least one of said plurality of data paths.

20. The system according to claim 11, wherein said hardware accelerator is operable to selectively perform of one or more of a plurality of operations comprising finite impulse response filtering operations, windowing operations, frame overlap reconstruction operations and least mean square adaptation operations based on said configuring said data paths.

* * * * *